United States Patent [19]

Mesmer et al.

[11] Patent Number: 4,655,952

[45] Date of Patent: Apr. 7, 1987

[54] DETERGENT AND METHOD FOR PRODUCING THE SAME

[75] Inventors: Otto Mesmer, Wuppertal; Wolfgang Polligkeit, Ennepetal; Ernst-Uwe Schiffer, Wuppertal; Wolfgang Tröger, Pulheim/Stommeln; Andreas Wolter, Wülfrath, all of Fed. Rep. of Germany

[73] Assignee: Vorwerk & Co. Interholding GmbH, Wuppertal, Fed. Rep. of Germany

[21] Appl. No.: 705,680

[22] Filed: Feb. 26, 1985

[30] Foreign Application Priority Data

Mar. 2, 1984 [DE] Fed. Rep. of Germany ....... 3434817

[51] Int. Cl.[4] .......................... C08G 12/12; C08J 9/40; C09K 3/22; C11D 3/37

[52] U.S. Cl. ....................................... 252/88; 252/91; 252/174; 521/91; 521/92; 521/122; 521/123; 521/188

[58] Field of Search .................. 521/91, 92, 123, 122, 521/188; 252/88, 91, 134, 174

[56] References Cited

U.S. PATENT DOCUMENTS

| | | | |
|---|---|---|---|
| 2,559,891 | 7/1951 | Meyer | 521/188 |
| 3,231,525 | 1/1966 | Kelly | 521/188 |
| 3,312,639 | 4/1967 | Justice | 521/188 |
| 4,013,594 | 3/1977 | Froehlich | 252/544 |
| 4,092,277 | 5/1978 | Moore | 521/188 |
| 4,108,800 | 8/1978 | Froehlich | 252/541 |
| 4,278,770 | 7/1981 | Chandalia | 521/99 |
| 4,434,067 | 2/1984 | Malone | 252/88 |
| 4,489,175 | 12/1984 | Baumann | 521/116 |

FOREIGN PATENT DOCUMENTS

| | | | |
|---|---|---|---|
| 2511854 | 9/1975 | Fed. Rep. of Germany | 252/88 |
| 2917064 | 11/1980 | Fed. Rep. of Germany . | |
| 57-126900 | 8/1982 | Japan | 252/88 |

*Primary Examiner*—Dennis L. Albrecht

*Attorney, Agent, or Firm*—Walter Ottesen

[57] ABSTRACT

The invention is directed to a detergent and a method of producing the same. The detergent is for textile surfaces and especially for textile floor coverings. The detergent includes a pulverized, porous carrier including a foamed, plastified urea-formaldehyde resin foam. The carrier material is enriched with detergent so that the finished product with respect to the carrier material has a weight per unit volume of 60 kg/m$^3$ and an apparent density of 50 to 150 grams/liter; the granular size of the carrier material is between 0.01 and 12 mm; the surfactant containing water, which adheres to the carrier material, is stored in the carrier material in a completely homogeneous manner in a share of maximally 80% by weight referred to the weight of the carrier material; and, the detergent is produced from the mixture of the carrier material with a highly concentrated aqueous cleaning solution. The method includes the steps of foaming the plastified urea-formaldehyde resin foam; and, combining the free formaldehyde present during the manufacturing process prior to and/or during the foaming of the plastified urea-formaldehyde resin foam by adding formaldehyde binding substances and stabilizing substances to at least one of the solutions selected from the group consisting of the foaming agent solution and the resin solution.

4 Claims, 1 Drawing Figure

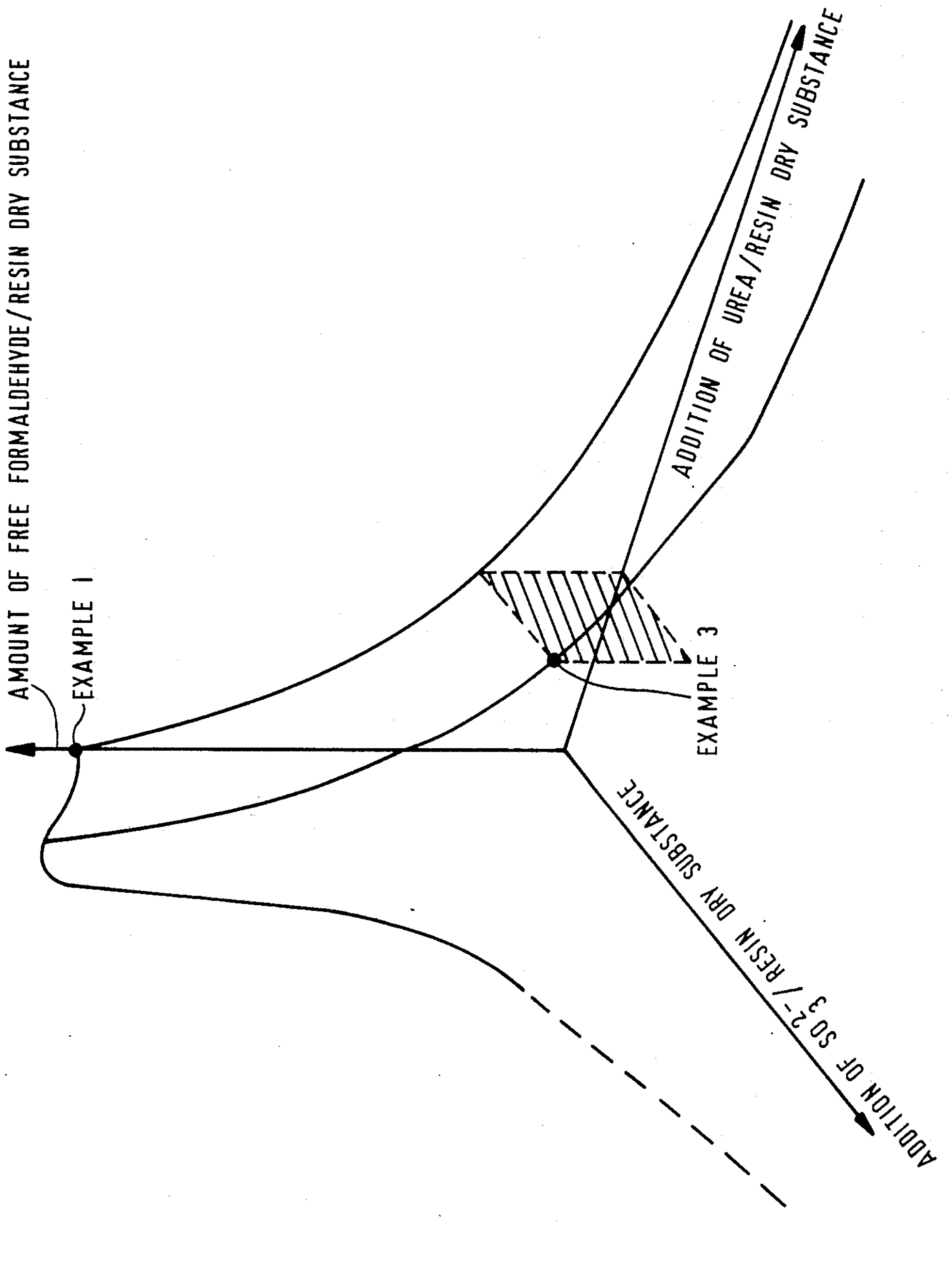
AMOUNT OF FREE FORMALDEHYDE/RESIN DRY SUBSTANCE
EXAMPLE 1
ADDITION OF UREA/RESIN DRY SUBSTANCE
EXAMPLE 3
ADDITION OF $SO_3^{2-}$/RESIN DRY SUBSTANCE

DETERGENT AND METHOD FOR PRODUCING THE SAME

FIELD OF THE INVENTION

The invention relates to a detergent and to a method for producing the same. The detergent is for textile surfaces and especially for textile floor coverings. The detergent includes a pulverized, porous carrier material including a foamed, plastified urea-formaldehyde resin foam. The carrier material is enriched with detergent so that the finished product with respect to the carrier material has a weight per unit volume of 60 $kg/m^3$ and an apparent density of 50 to 150 grams/liter, the granular size of the carrier material being between 0.01 and 12 mm. The detergent further includes water containing tenside and adhering to the carrier material, the water being stored in the carrier material in a completely homogeneous manner in a share of maximally 80% by weight referred to the weight of the carrier material. The detergent is produced from the mixture of the carrier material with a highly concentrated aqueous cleaning solution.

BACKGROUND OF THE INVENTION

The above-mentioned type of processes for producing detergents have the purpose of manufacturing a rational and environmentally beneficial detergent in one working step. The detergent made in this manner can be applied by the user without any negative effect. One such negative effect is present if the formaldehyde escaping from urea-formaldehyde resin foam and used in manufacture gets into the air during cleaning. Processes are known to prevent this from happening wherein the free formaldehyde from the urea-formaldehyde resin foam is reduced by means of a subsequent addition of formaldehyde binding agents.

Accordingly, German published patent application DE-OS No. 29 17 064 discloses, for example, a process for reducing the development of formaldehyde from amino-plastic foam material wherein the finished foam material is surface treated with a formaldehyde binding agent which is essentially non-volatile and which draws moisture. In this connection, the formaldehyde binding agent should be an aqueous solution of urea or a salt of the sulfuric acids as well as an aqueous mixture of urea, ammonia, ammonia sulfite and an agent for holding water or an agent for attracting water.

In methods of the above-mentioned type, it is disadvantageous that these agents must be added subsequently to the foam substance or the amino-plastic carrier material; this especially involves a further process step. Furthermore, it has been shown to be disadvantageous that a non-homogeneous distribution of the formaldehyde binding agents results, especially in a non-comminuted condition. This again causes an increased emission of the formaldehyde during production and further processing of the foam material to a detergent.

Further, a method is known wherein the formaldehyde content required for production is reduced in moist amino-plastic carrier materials for detergents by means of the combination of an additive solution with the formaldehyde catchers urea and sulfite.

With all known methods, it is a disadvantage that costly environmental measures are mandated for the production of a granular carrier material produced by grinding from foamed urea-formaldehyde resin foam because of the intense emissions of formaldehyde which occur in connection with this production.

SUMMARY OF THE INVENTION

In view of the foregoing, it is an object of the invention to provide a method for producing a detergent for textile surfaces wherein the urea-formaldehyde resin foam used as a carrier material is held virtually free of free formaldehyde already during the manufacturing process while at the same time maintaining the mechanical characteristics of the foam with respect to the further processing and utilization.

According to a feature of the invention, before and/or during the foaming of the plastified urea-formaldehyde resin foam, the free formaldehyde present is combined during the production process in that formaldehyde-binding substances as well as stabilizing substances are added to at least one of the solutions selected from the group consisting of the foaming agent solution and the resin solution (with the exception of sulfite in connection with the foaming agent solution).

Another feature of the invention provides that urea is added to the aqueous urea-formaldehyde pre-condensate prior to and/or during foaming so that a molar ratio of total urea to total formaldehyde of between 0.62 and 0.95 to 1 is present in the finished foam and that 0% to 1.64% by weight of sulfite ($SO_3^{--}$), (referred to the resin dry substance) are added to the aqueous urea-formaldehyde pre-condensate in the form of a water-soluble salt of sulfurous acid prior to and/or during foaming, and in that 0.001% to 5% by weight of thixotropic substances (for example, laminated silicate or aerosil) are added to the aqueous resin pre-condensate solution and/or to the foaming agent solution for stabilizing the urea-formaldehyde resin foam during hardening (polycondensation).

DESCRIPTION OF THE PREFERRED EMBODIMENTS OF THE INVENTION

The invention will now be explained in the following by way of examples, and with respect to the drawing.

Resin Component A

Composed of an aqueous solution of a pre-condensed ureaformaldehyde resin with a total urea to a total formaldehyde content of 0.65 to 1 and a solids content of 44% by weight.

Surfactant Concentrate Component B

Composed of an aqueous solution of a mixture of phosphoric acid (30%) and an alkylnaphthalene sulfonate (10%).

In addition to being composed of phosphoric acid and tenside (for example, alkylnaphthalene sulfonate or alkylbenzene sulfonate), the foaming agent further includes foam-stabilizing substances. For this purpose, all thixotropic substances such as laminated silicates, aerosils, xanthanes, calcium hydrosilicates, suitable alumina, et cetera, may be used.

Comparison Example 1 (Conventional Process)

One $m^3$ of urea-formaldehyde resin foam with a volumetric weight of 40 $kg/m^3$ is produced by foaming up 56 parts by weight of the surfactant dilution composed of three parts by weight of surfactant concentrate B and 53 parts by weight of water with about 1 $m^3$ of air in a suitable foaming apparatus, by adding thereto 111 parts by weight of a resin dilution produced from 91.5 parts by weight of resin component A and 19.5 parts by weight of water, and by foaming in a mold.

From the foam block thus produced and hardened, samples are taken to determine the formaldehyde content and the strength.

Comparison Example 2 (with foam provided with formaldehyde-binding substances according to the teaching of the invention)

One $m^3$ of urea-formaldehyde resin foam with a volumetric weight of 40 $kg/m^3$ is produced by foaming up 56 parts by weight of the surfactant dilution composed of three parts by weight of surfactant concentrate B and 53 parts by weight of water with about 1 $m^3$ of air in a suitable foaming apparatus and by adding thereto an appropriately combined mixture composed of 91.5 parts by weight of resin component A and a mixture of 19.5 parts by weight of water and 2.9 parts by weight of urea.

From the foam block thus produced and hardened, samples are taken to determine the strength.

Comparison Example 3 (with foam provided with formaldehyde-binding and foam-stabilizing substances according to the teaching of the invention)

One $m^3$ of urea-formaldehyde resin foam with a volumetric weight of 40 $kg/m^3$ is produced by foaming up 56 parts by weight of the surfactant dilution composed of three parts by weight of surfactant concentrate B and 53 parts by weight of water with about 1 $m^3$ of air in a suitable foaming apparatus and by adding thereto an appropriately combined mixture composed of 91.5 parts by weight of resin component A and a mixture of 19.5 parts by weight of water, 4.4 parts by weight of urea, 0.027 parts by weight of sulfite (for example, in the form of sodium bisulfite) and 0.06 parts by weight of bentonite. In this process, the resin solution is set to a pH value of between 7 and 8.

From the foam block thus produced and hardened, samples are taken to determine the formaldehyde content.

Comparison Example 4 (with foam provided with formaldehyde-binding and foam-stabilizing substances according to the teaching of the invention)

One $m^3$ of urea-formaldehyde resin foam with a volumetric weight of 40 $kg/m^3$ is produced by foaming up 56 parts by weight of the surfactant dilution composed of three parts by weight of surfactant concentrate B, 0.16 parts by weight of a modified aerosil and 52.84 parts by weight of water with about 1 $m^3$ of air in a suitable foaming apparatus and by adding thereto an appropriately combined mixture composed of 91.5 parts by weight of resin component A and a mixture of 19.5 parts by weight of water and 2.9 parts by weight of urea.

From the foam block thus produced and hardened, samples are taken to determine the strength.

For analytical determination of the amount of free formaldehyde per resin dry mass, hot air is applied to the broken up, hardened and moist resin foam in a suitable apparatus to expel the formaldehyde which is then absorbed in a follow-on set of water-filled wash bottles.

The formaldehyde content of the absorption solutions is determined photometrically. For this purpose, the two solutions A and B indicated in the following are added. A reddish violet color will result the intensity of which is measured photometrically. Then a comparison is made with solutions having a known formaldehyde content.

Solution A (p Rosaniline Hydrochloride) 160 mg of p-rosaniline in 24 ml of concentrated hydrochloric acid are dissolved and then filled up to 100 ml with distilled water.

Solution B 27.2 g of mercuric chloride and 11.6 g of sodium chloride are dissolved in distilled water and filled to 1 liter. 50 ml are taken from this solution and 100 mg of anhydrous sodium sulfite are added thereto immediately before use.

In a graduated flask holding 25 ml, 1 ml of each solution A and B is added to an aliquot part of the absorption solution and filled up with distilled water. The solution is mixed well and allowed to rest for 60 minutes at 20° C. Then the extinction of the reddish violet color is measured in 2 cm of layer thickness at 564 nm. The formaldehyde content is compared with solutions having a formaldehyde content of 10, 20, 30 and 40 $\mu g$ each in 25 ml of solution.

Table I below reflects the measurement results illustrated in the drawing:

TABLE 1

| | | |
|---|---|---|
| Example 1 | Foam According to Conventional Process | 8.8 mg of Formaldehyde/g of Dry Materials |
| Example 2 | Foam According to the Teaching of the Invention | 1.8 mg of Formaldehyde/g of Dry Materials |

Table 2 reflects the stabilizing effect of the stabilizing substances of claim 4, with the strength being tested applying German Testing Standards DIN 53577 and DIN 53421.

TABLE 2

| | | |
|---|---|---|
| Example 1 | Foam According to Conventional Process | 0.087 $N/mm^2$ |
| Example 3 | Foam According to the Teaching of the Invention | 0.73 $N/mm^2$ |
| Example 4 | Foam According to the Teaching of the Invention | 0.088 $N/mm^2$ |

It is understood that the foregoing description is that of the preferred embodiments of the invention and that various changes and modifications may be made thereto without departing from the spirit and scope of the invention as defined in the appended claims.

What is claimed is:

1. Method for producing a detergent for textile surfaces such as textile floor coverings, comprising:

a pulverized, porous carrier material which includes a foamed, plastified urea-formaldehyde resin foam enriched with detergent so that the finished product with respect to the carrier material has a weight per unit volume of 60 $kg/m^3$ and an apparent density of 50 to 150 grams/liter, the carrier material having a granular size of between 0.01 and 12 mm; and a water containing surfactant and adhering to the carrier material, the water being stored in the carrier material in a completely homogeneous manner with a share of maximally 80% by weight referred to the weight of the carrier material, the detergent resulting from a mixture of the carrier material with a highly concentrated aqueous cleaning solution, the method comprising the steps of:

foaming about 56 parts by weight of a surfactant comprising about 3 parts by weight of an aqueous solution of about 30% phosphoric acid and about 10% alkylnapthalene sulfonate, and about 53 parts by weight of water with air; and, adding thereto a mixture containing about 91.5 parts by weight of an aqueous solution of a pre-condensed urea-formaldehyde resin and a mixture comprising about 19.5 parts by weight of water, about 4.4 parts by weight of urea, about 0.027 parts by weight of sulfite and about 0.06 by weight of bentonite.

2. The method of claim 1, comprising a the step of adding urea to the aqueous urea-formaldehyde pre-condensate prior to said foaming so that a molar ratio of total urea to total formaldehyde of between 0.62 and 0.95 to 1 is present in the finished foam.

3. The method of claim 2, wherein the sulfite is added in the form of a water-soluble salt of sulfurous acid.

4. Detergent for textile surfaces such as textile floor coverings comprising:

a pulverized, porous carrier material which comprises a foamed, plastified urea-formaldehyde resin foam enriched with detergent so that the finished product with respect to the carrier material has a weight per unit volume of 60 kg/m$^3$ and an apparent density of 50 to 150 grams/liter, the carrier material having a granular size of between 0.01 and 12 mm;

a water containing surfactant and adhering internally to the carrier material, the water being stored in the carrier material in a completely homogeneous manner with a share of maximally 80% by weight referred to the weight of the carrier material; said foam being prepared by foaming about 56 parts by weight of a surfactant containing about 3 parts by weight of an aqueous solution of about 30% phosphoric acid and about 10% alkylnaphthalene sulfonate, and about 53 parts by weight of water with air, adding thereto a mixture containing about 91.5 parts by weight of an aqueous solution of a precondensed urea-formaldehyde resin and a mixture of about 19.5 parts by weight of water, about 4.4 parts by weight of urea, about 0.027 parts by weight of sulfite and about 0.06 by weight of bentonite; and, the detergent resulting from a mixture of the carrier material with a highly concentrated aqueous cleaning solution.

* * * * *